United States Patent
Tran et al.

(10) Patent No.: US 7,140,023 B2
(45) Date of Patent: Nov. 21, 2006

(54) SYMBOLIC BUFFER ALLOCATION IN LOCAL CACHE AT A NETWORK PROCESSING ELEMENT

(75) Inventors: Dennis D. Tran, San Jose, CA (US); Harshawardhan Vipat, San Jose, CA (US); Khoi-Nguyen T. Tong, Fremont, CA (US); Uday R. Naik, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 325 days.

(21) Appl. No.: 10/699,638

(22) Filed: Oct. 31, 2003

(65) Prior Publication Data

US 2005/0097295 A1    May 5, 2005

(51) Int. Cl.
*G06F 13/16* (2006.01)
(52) U.S. Cl. .................. 718/108; 718/105; 710/52; 711/5; 711/170
(58) Field of Classification Search ................. 711/170
See application file for complete search history.

(56) References Cited

U.S. PATENT DOCUMENTS

| | | | | |
|---|---|---|---|---|
| 5,953,530 A | * | 9/1999 | Rishi et al. | 717/127 |
| 6,058,460 A | * | 5/2000 | Nakhimovsky | 711/153 |
| 6,925,546 B1 | * | 8/2005 | Krejsa | 711/173 |

OTHER PUBLICATIONS

The Processing Element, Liljqvist Bjorn, nplogic, May 29, 2003☐☐http://web.archive.org/web/20030529131332/http://tech.nplogic.com/architecture/pe/html.*

* cited by examiner

*Primary Examiner*—B. James Peikari
(74) *Attorney, Agent, or Firm*—Buckley, Maschoff & Talwalkar LLC

(57) ABSTRACT

According to some embodiments, a portion of local memory allocated to a thread by a programming statement includes an indication of a read/write status of the portion and symbolically references a buffer name wherein the symbolically referenced buffer name includes both letters and numbers.

20 Claims, 6 Drawing Sheets

SYMBOLIC BUFFER ALLOCATION IN LOCAL CACHE AT A NETWORK PROCESSING ELEMENT

BACKGROUND

1. Field of the Invention

The present invention pertains to the field of network processing elements.

2. Background Art

A network processor may facilitate an exchange of information via one or more networks. For example, a network processor may receive, process, and transmit packets of information. Some network processors include a number of high-speed processing elements (e.g., microengines) to process the packets in the data plane. For example, a processing element may parse headers associated with information packets (e.g., to determine how each information packet should be processed and/or transmitted).

A modified version of a standard high-level programming language, such as a modified version of a C programming language, may be used to create code for the processing elements. The modified version may comprise, for example, a subset of the American National Standards Institute (ANSI)/International Standards Organization (ISO)/International Engineering Consortium (IEC) standard entitled "Programming Languages—C," Document Number 9899 (Dec. 1, 1999) along with some additional hardware intrinsic functions (e.g., functions associated with the processing element).

DETAILED DESCRIPTION

Some embodiments described herein are associated with a "network processor." As used herein, the phrase "network processor" may refer to, for example, a device that facilitates an exchange of information via a network, such as a Local Area Network (LAN), or a Wide Area Network (WAN). By way of example, a network processor might facilitate an exchange of information packets in accordance with the Fast Ethernet LAN transmission standard 802.3-2002® published by the Institute of Electrical and Electronics Engineers (IEEE). Moreover, a network processor may be associated with a switch, a router (e.g., an edge router), a layer 3 forwarder, and/or protocol conversion. Examples of network processors include those in the INTEL® IXP 2800 family of network processors.

Figure 1:
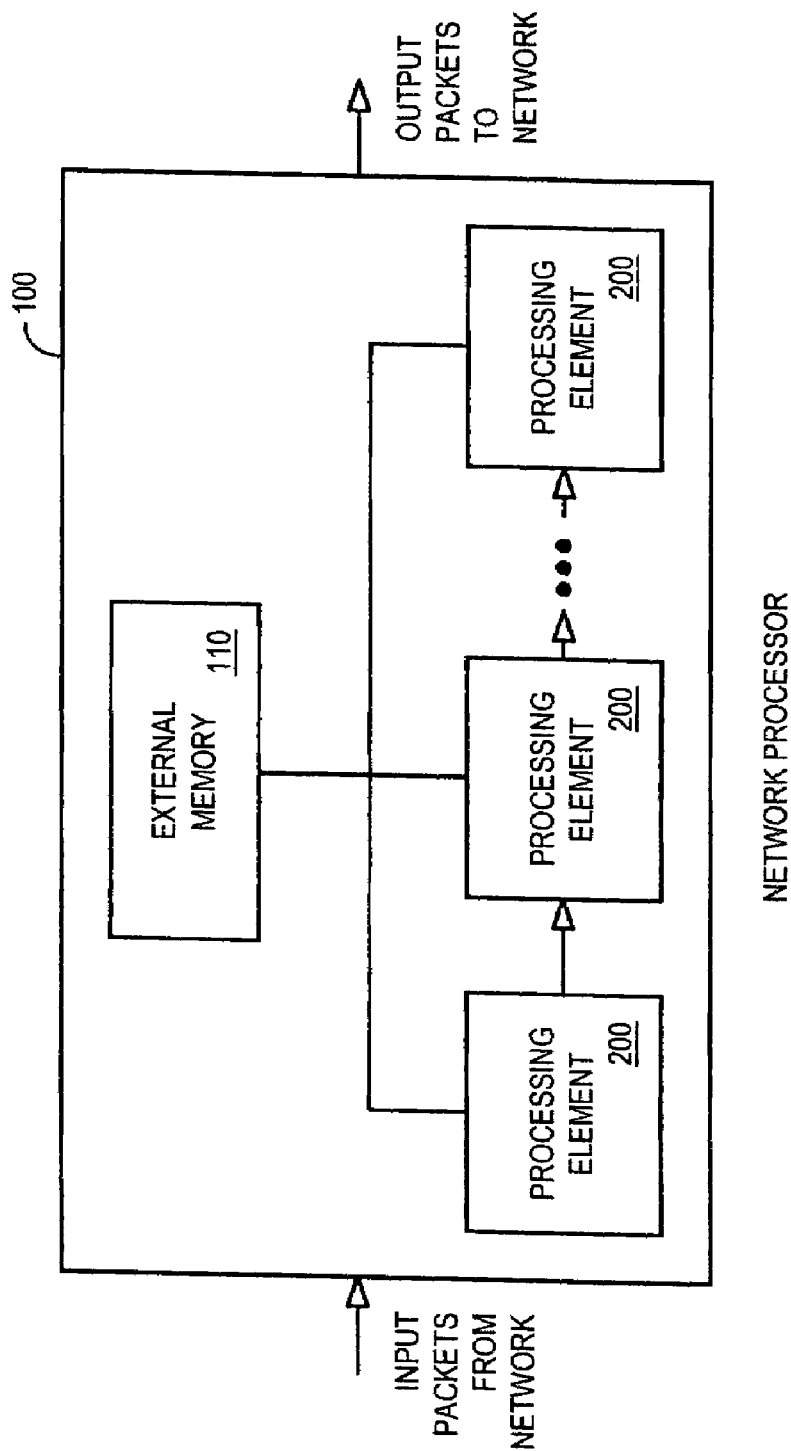
FIG. 1 is a block diagram of a network processor.

FIG. 1 is a block diagram of a network processor 100 according to some embodiments. The network processor 100 includes a number of processing elements 200 that perform information packet processing in the data plane. For example, the processing elements 200 may comprise multithreaded, Reduced Instruction Set Computer (RISC) microengines that are programmed to perform information packet processing.

Note that different processing elements 200 might be programmed to perform different tasks. By way of example, one processing element 200 might receive input information packets from a network interface. Another processing element 200 might process the information packets, while still another one forwards output information packets to a network interface. That is, the operation of the network device 100 may be determined at least in part by code that is loaded into, and executed by, the processing elements 200 (e.g., packet processing applications).

The processing elements 200 may store data into and retrieve information from an external memory 110, such as a Static Random Access Memory (SRAM) unit. For example, a packet processing application might store packet data and state information in the external memory 110. However, the application might need to access this information frequently to make processing decisions—and the latency associated with accessing the external memory 110 can be significant (e.g., retrieving a large packet header might take hundreds of cycles). As a result, it may be impractical to store this type of packet information in the external memory 110.

Instead, a processing element 200 may store packet information in local memory (e.g., memory located at the processing element 200 and/or local hardware registers), such as by storing packet information in buffers located in a local cache memory at the processing element 200. Note that the processing element 200 may execute multiple threads of code. Although hardware support may be provided to maintain and switch thread "contexts" (e.g., information associated with a particular thread), management of the local memory is left to the code that is executed by the processing element 200.

For example, an application executing on a processing element might need to implement caching schemes so that multiple threads can store packet information into (and retrieve packet information from) buffers that are located in local memory. As a result, it can be difficult to write high-level programming language statements to manage the data (e.g., to ensure that a second thread does not accidentally destroy data needed by a first thread). In addition, the high-level programming language statements typically refer to local memory locations using numeric values, which may not be intuitive for a programmer. These problems can make writing and debugging application software for a processing element 200 a time-consuming and error prone task.

Figure 2:
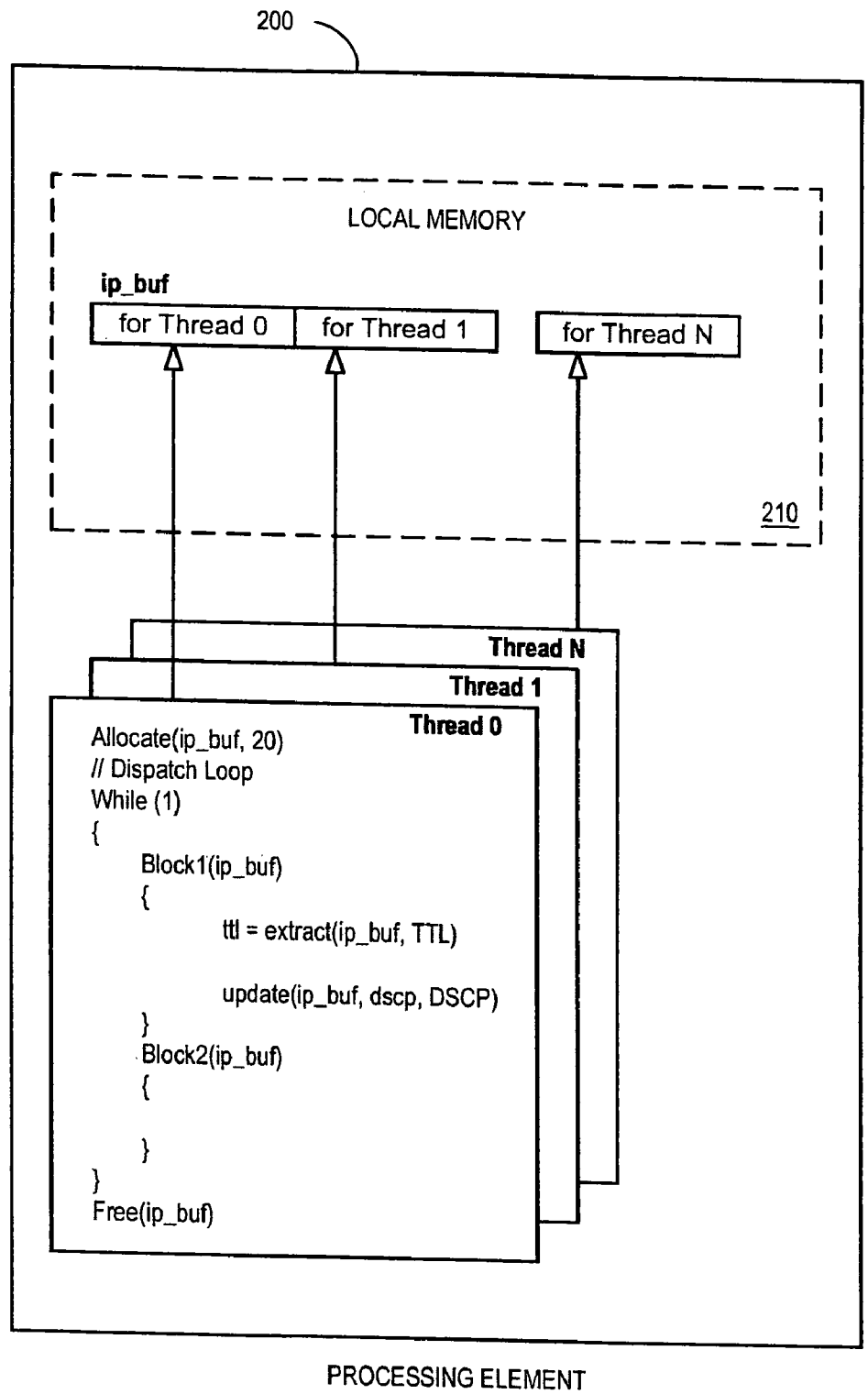
FIG. 2 is a block diagram of a processing element according to some embodiments.

FIG. 2 is a block diagram of a processing element 200 according to some embodiments. According to these embodiments, a high-level programming language may include a programming statement that uses a "buffer name" to symbolically reference information that a first thread context will store in local memory 210. For example, as illustrated in FIG. 2, the programming statement Allocate (ip_buf, 20) associated with Thread 0 uses the name "ip_buf" to create a 20-byte buffer for Thread 0 in local memory 210. The same programming statement in another thread (e.g., thread N) can use the same buffer name to create another buffer in the local memory 210 for that thread.

Moreover, a thread can store information into (and retrieve information from) the appropriate portion of the local memory 210 simply by using the buffer name. A thread may also include a programming statement to indicate that a particular buffer is no longer needed by that thread (e.g., Free(ip_buf)). In this way, the area in local memory 210 associated with that buffer can re-used by the application for another purpose.

Figure 3:
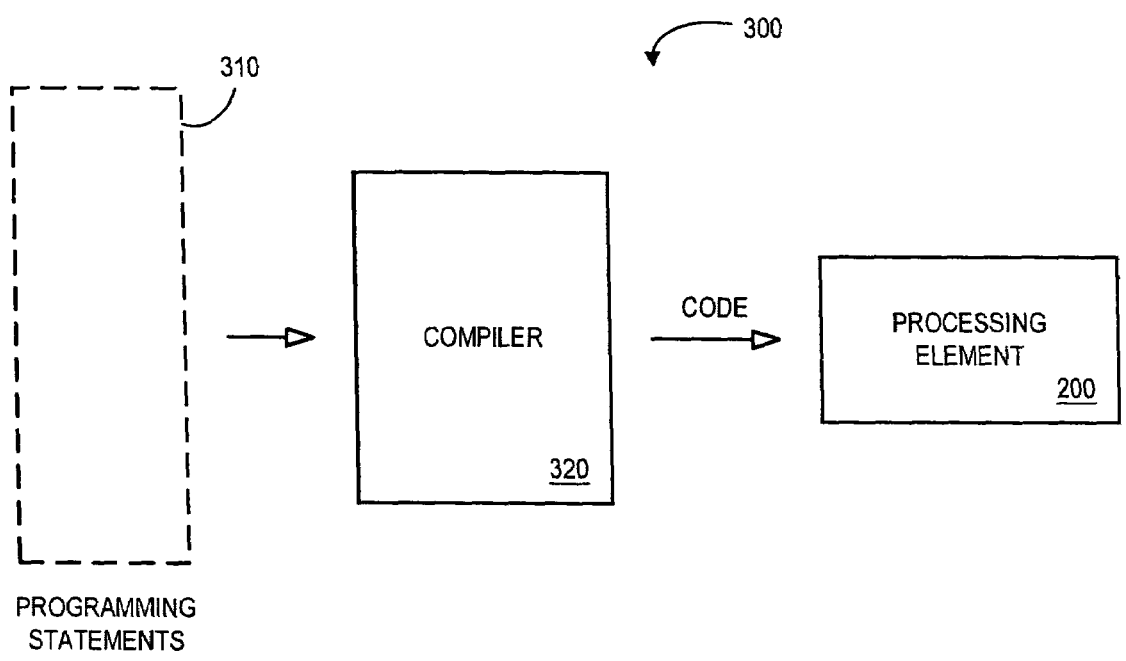
FIG. 3 is an information flow diagram according to some embodiments.

FIG. 3 is an information flow diagram 300 according to some embodiments. In particular, a set of high-level programming language statements 310 is provided to a compiler 320. The set of programming statements 310 may include, for example, (i) statements defined in a standard programming language (e.g., C) and/or (ii) statements defined in a programming language adapted to facilitate programming of a processing element 200, such as the INTEL® Network Classification Language (NCL). Note that the compiler 320 may comprise, for example, a software application or a hardware device. Moreover, the compiler 320 might receive the programming statements 310 from memory, a magnetic medium, or another software application or hardware device.

The compiler 320 translates the programming statements 310 into code (e.g., assembly language code or microcode). For example, the compiler 320 may generate code that can be executed by a processing element 200 with local memory. In particular, the compiler 320 may arrange for a portion of the local memory to be allocated to a thread context in accordance with a programming statement that includes a symbolic buffer name reference.

According to some embodiments, the compiler 320 translates an "allocate(ip_buf, 20)" using pre-processor directives. These directives may, for example, instruct the compiler 320 to perform certain text replacements before starting the compilation process. For example, directive "#define xxx yyy" may instruct the compiler 320 to replace all the occurrences of text "xxx" with "yyy." In this case, one programming statement may reserve a symbolic name to be used in a given context. Based on another programming statement, the compiler 320 may then associate that symbolic name with a physical address. Still another programming statement may cause the compiler 320 to set up a hardware register to point to an appropriate instance based on a thread identifier parameter.

The following are examples of programming statements that might be associated with some embodiments described herein. Any number of other implementations could instead be provided.

One type of programming statement might be an "allocate buffer" instruction, such as:

xbuf_alloc(xbuf_name, num_of_regs, rw_indicator)

where "xbuf_name" represents the symbolic name of the buffer, and the instruction further indicates a number of registers to be associated with the buffer along with a read/write indication. The read/write indication might, for example, indicate a type of access that will be permitted for the buffer (e.g., read-only, write-only, or read-write access). This information might be required, for example, when the buffers are stored in hardware registers at the processing element.

Another type of programming statement might be a "bind buffer address" instruction, such as:

xbuf_bind_address(xbuf_name, base, size, offset)

where "xbuf_name" represents the symbolic name of the buffer, and the instruction further indicates the base (e.g., a physical address for the name from which per-thread instances will be laid out), size (e.g., how big each buffer will be), and offset (e.g., an offset representing where data will start) of the buffer in local memory.

Another type of programming statement might be an "activate buffer" instruction that sets the local memory address and manages the thread associated with the buffer, such as:

xbuf_activate(xbuf_name, lmem_index, thread_id, wait_cycle)

where "xbuf_name" represents the symbolic name of the buffer, and the instruction further indicates the local memory index (e.g., which hardware register to use), thread identifier (e.g., 0 through N), and wait cycle information associated with the buffer. The wait cycle information might, for example, be used when it takes a few cycles to set the hardware registers. In this case, the wait cycle information may indicate if a call should wait until the register is set or should return immediately to the caller.

Still another type of programming statement might be a "deactivate buffer" instruction to un-associate the buffer's thread with the local memory address and index, such as:

xbuf_deactivate(xbuf_name)

where "xbuf_name" represents the symbolic name of the buffer.

Yet another type of programming statement might be a "free buffer" instruction to de-allocate the buffer in local memory, such as:

xbuf_free(xbuf_name)

where "xbuf_name" represents the symbolic name of the buffer.

The following is one example of how these types of programming statements might be used:

```
#define          WAIT          1
#define          NO_WAIT       0
#define_eval     ipv4_hdr      lmem_buf0
#define_eval     ipv6_hdr      lmem_buf1
#define_eval     mpls_hdr      lmem_buf2
xbuf_alloc(ipv4_hdr, 8, read_write)
xbuf_alloc(ipv6_hdr, 10, read_write)
xbuf_alloc(mpls_hdr, 10, read_write)
xbuf_bind_address(ipv4_hdr, IPV4_BASE, IPV4_SIZE,
IPV4_OFFSET)
xbuf_bind_address(ipv6_hdr, IPV6_BASE, IPV6_SIZE,
IPV6_OFFSET)
xbuf_bind_address(mpls_hdr, MPLS_BASE, MPLS_SIZE,
MPLS_OFFSET)
xbuf_activate(ipv4_hdr, LM_INDEX0, THREAD_0, NO_WAIT)
xbuf_activate(ipv6_hdr, LM_INDEX1, THREAD_1, WAIT)
// uses of ipv4_hdr and ipv6_hdr, for example:
//     ipv4_hdr[0] = ipv4_hdr[1] + ipv4_hdr[2]
//     calling_some_macro(ipv6_hdr)
xbuf_deactivate(ipv4_hdr)
xbuf_deactivate(ipv6_hdr)
xbuf_activate(mpls_hdr, LM_INDEX0, THREAD_0, WAIT)
// uses of mpls_hdr with local memory index register 0
xbuf_free(ipv4_hdr)
xbuf_free(ipv6_hdr)
xbuf_free(mpls_hdr)
```

Where "ipv4_hdr" is a symbolic name for a buffer in local memory that stores packet information in accordance with the Internet Protocol Version 4 (IPv4) as defined by the Internet Engineering Task Force (IETF) Request For Comment (RFC) 1730 entitled "Internet Message Access Protocol—Version 4" (1994). Similarly, "ipv6_hdr" is a symbolic name for a buffer in local memory that stores packet information in accordance with the Internet Protocol Version 6 (IPv6) as defined by IETF RFC 2373, "IP Version 6 Addressing Architecture" (July, 1998). Finally, "mpls_hdr" is a symbolic name for a buffer in local memory stores Multi-Protocol Label Switching (MPLS) information. Moreover, multiple versions of the ipv4_hdr buffer, the ipv6_hdr buffer, and/or the mpls_hdr buffer can exist in local memory in connection with multiple thread contexts.

After translating the programming statements 310, the compiler 320 may output the appropriate code (e.g., to memory, a magnetic medium, or another software application or hardware device). Note that the code might also be linked as appropriate. The code may then be loaded into and executed by a processing element 200 in a network processor 100.

In this way, some embodiments let an application thread allocate named buffers in local memory, and each buffer may have its own memory space. Note that different threads may execute identical high-level programming language statements, but each thread will access different locations in memory (e.g., to store different data). Moreover, named buffers may be passed in functions or macros, making applications portable and scalable.

Figure 4:
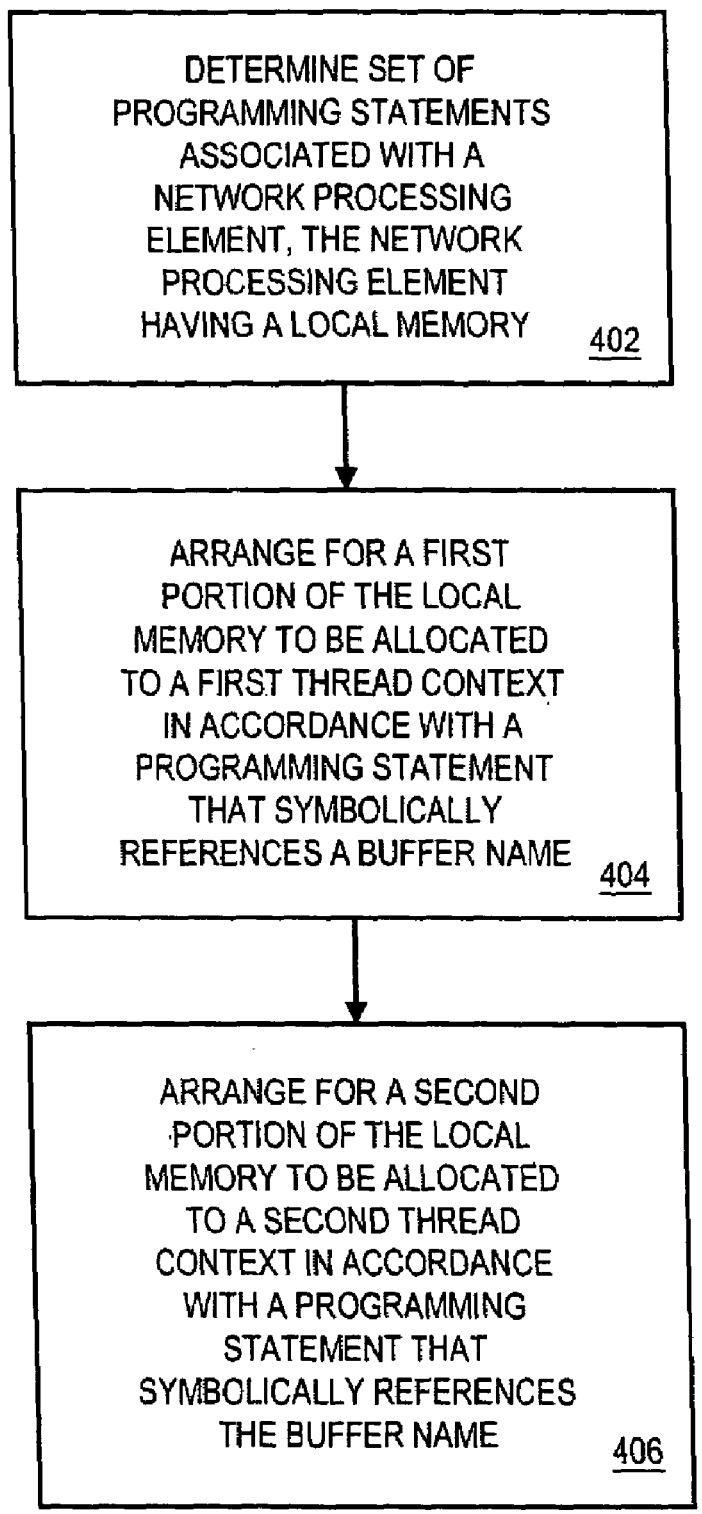
FIG. 4 is a flow chart of a method that may be performed by a compiler according to some embodiments.

FIG. 4 is a flow chart of a method that may be performed by a compiler according to some embodiments. The flow charts described herein do not imply a fixed order to the actions, and embodiments may be practiced in any order that is practicable. The method may be associated with, for example, the compiler 320 illustrated in FIG. 3. Note that any of the methods described herein may be performed by hardware, software (including microcode), or a combination of hardware and software. For example, a storage medium may store thereon instructions that when executed by a machine results in performance according to any of the embodiments described herein.

At 402, a set of programming statements is determined. For example, a compiler might receive the programming statements from a storage device (e.g., associated with memory or a magnetic medium), another software application, or a hardware device.

At 404, it is arranged for a first portion of local memory to be allocated to a first thread context in accordance with a programming statement that is associated with a first thread and that symbolically references a buffer name. For example, the compiler may translate the programming statement into code such that the code will allocate a portion of the local memory to a particular buffer for that particular thread context. Similarly, it is arranged at 406 for a second portion of the local memory to be allocated to a second thread context in accordance with a programming statement that is associated with a second thread and that symbolically references the buffer name. Note that the programming statements associated with the first and second threads might be different or might be the same (e.g., but in either case are associated with different threads).

Other instructions may symbolically reference the buffer name such that information associated with a thread context will be stored in the appropriate area of local memory. Still other instructions may symbolically reference the buffer name to free buffers in the local memory. According to some embodiments, the compiler also outputs the code associated with the set of programming statements (e.g., to be loaded into and executed by a microengine).

Figure 5:
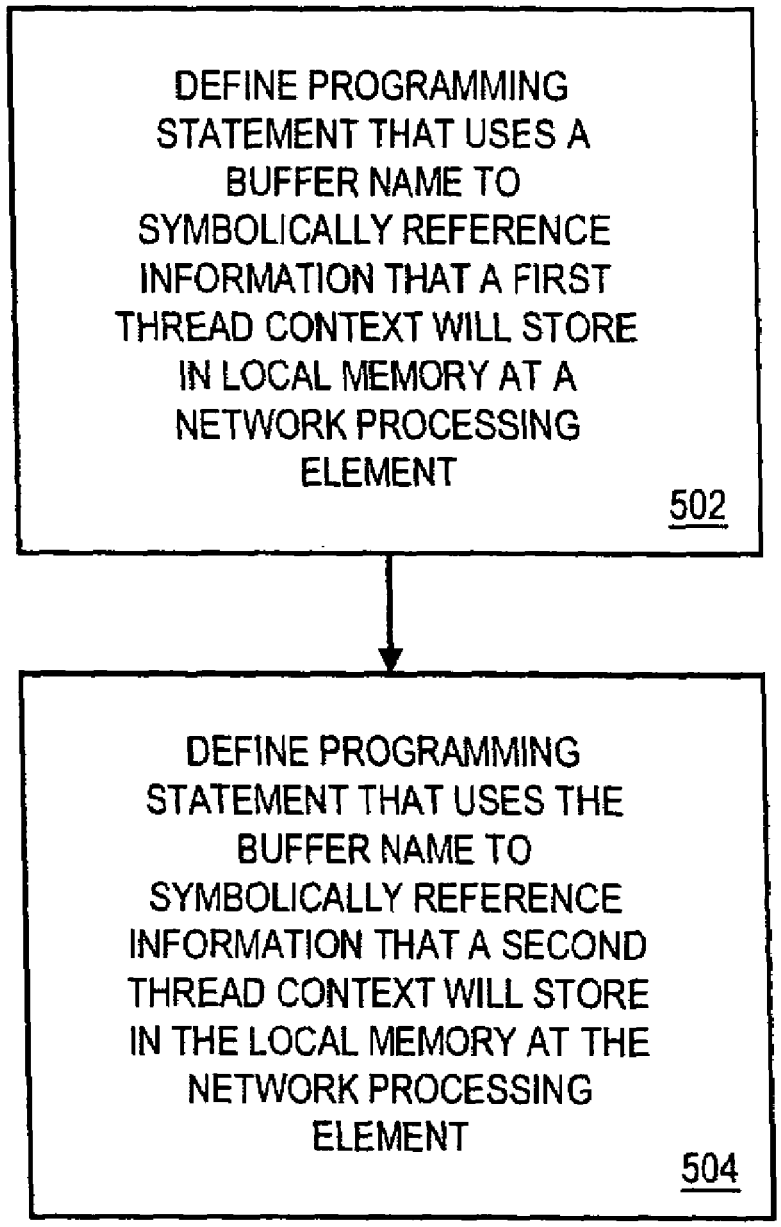
FIG. 5 is a flow chart of a programming method according to some embodiments.

FIG. 5 is a flow chart of a programming method according to some embodiments. The method may be performed, for example, by a programmer who is defining how a processing element 200 should operate. At 502, he or she defines a programming statement associated with a first thread that uses a buffer name to symbolically reference information that a first thread context will store in local memory at a network processing element. Similarly, at 504 the programmer defines a programming statement associated with a second thread that uses the buffer name to symbolically reference information that a second thread context will store in the local memory at the network processing element. The programming statements may then be compiled (e.g., using a special C compiler), linked, and executed.

In this way, a more efficient and less error prone way may be provided to program and manage memory buffer allocations in local memory (e.g., in cache memory). That is, the allocations may be performed without requiring the programmer to implement complicated per-thread management of local memory pointers or pointer ranges. As a result, the development process (e.g., writing and debugging an application) may be improved. Moreover, the compiler may provide for efficient pre-processing of the program statements and reduce the overhead associated with code space and/or execution cycles.

Figure 6:
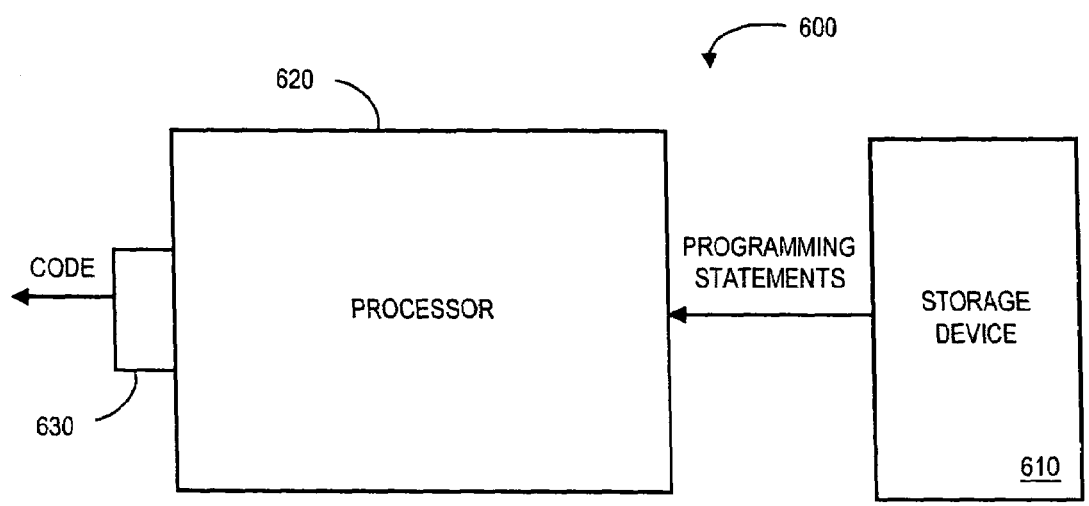
FIG. 6 is a block diagram of a system according to some embodiments.

FIG. 6 is a block diagram of a system 600 according to some embodiments. The system includes a processor 620 that retrieves programming statements from a storage device 610 (e.g., a hard disk drive). The processor 620 may further compile the programming statements in accordance with any of the embodiments described herein. For example, the processor 620 might translate C programming language statements into code along with a programming statement that uses a symbolic reference to a buffer in local memory at a network processing element. The system 600 may further include an interface to facilitate the transfer code from the system 600 to a processing element (e.g., a microengine not illustrated in FIG. 6).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although particular programming languages have been described herein (e.g., the C programming language and NCL), embodiments may be used with other programming languages. Similarly, although particular information packet protocols have been described, embodiments may be associated with other types of protocols, such as the Asynchronous Transfer Mode (ATM) protocol defined by ATM Forum Technical Committee document number AF-TM-0121.000 entitled "Traffic Management Specification Version 4.1" (March 1999). In addition, although software or hardware have been described as performing various functions, such functions might be performed by either software or hardware (or a combination of software and hardware).

The several embodiments described herein are solely for the purpose of illustration. Persons skilled in the art will recognize from this description other embodiments may be practiced with modifications and alterations limited only by the claims.

What is claimed is:

1. A method, comprising:
    retrieving a set of allocate buffer instructions from a storage device associated with a multithreaded network processing element, the network processing element having a local memory;
    arranging for a first portion of the local memory to be allocated to a first thread context in accordance with an allocate buffer instruction that is associated with a first thread and symbolically references a buffer name, the allocate buffer instruction includes an indication of a read/write status of the first portion; and arranging for a second portion of the local memory to be allocated to a second thread context in accordance with an allocate buffer instruction that is associated with a second thread and symbolically references the buffer name, the allocate buffer instruction includes an indication of a read/write status of the second portion; and wherein the symbolically referenced buffer name includes both letters and numbers.

2. The method of claim 1, further comprising:

including a base, size, and offset with the allocate buffer instruction associated with the first thread.

3. The method of claim 1, wherein said arranging comprises translating the allocate buffer instructions into code.

4. The method of claim 1, further comprising:

arranging for information associated with the first thread context to be stored in the first portion of the local memory; and arranging for information associated with the second thread context to be stored in the second portion of the local memory.

5. The method of claim 1, further comprising:

freeing the second portion of the local memory in accordance with another allocate buffer instruction that symbolically references the buffer name.

6. The method of claim 1, wherein the symbolic reference to the buffer name may be passed in at least one of: (i) a function, and (ii) a macro.

7. The method of claim 1, further comprising:

translating the set of allocate buffer instructions into code; and providing the code.

8. The method of claim 7, wherein the provided code is associated with at least one of: (i) assembly language, and (ii) microcode.

9. The method of claim 1, wherein the local memory comprises at least one of: (i) memory at the network processing element, (ii) hardware registers at the network processing element, and (iii) a local cache.

10. The method of claim 1, wherein the network processing element is a reduced instruction set computer microengine in a network device.

11. The method of claim 10, wherein the network device is associated with at least one of: (i) information packet header parsing, (ii) exception packet identification, (iii) information packet receipt, (iv) information packet transformation, and (v) information packet transmission.

12. The method of claim 10, wherein the network device is associated with at least one of: (i) Internet protocol information packets, (ii) Ethernet information packets, (iii) asynchronous transfer mode protocol, (iv) a local area network, (v) a wide area network, (vi) a network processor, (vii) a switch, and (viii) a router.

13. An article, comprising:

a storage medium having stored thereon instructions that when executed by a machine result in the following:

retrieving a set of allocate buffer instructions from a storage device associated with a multithreaded network processing element, the network processing element having a local memory;

arranging for a first portion of the local memory to be allocated to a first thread context in accordance with a allocate buffer instruction that is associated with a first thread and symbolically references a buffer name, the allocate buffer instruction includes an indication of a read/write status of the first portion; and arranging for a second portion of the local memory to be allocated to a second thread context in accordance with an allocate buffer instruction that is associated with a second thread and symbolically references the buffer name, the allocate buffer instruction includes an indication of a read/write status of the second portion; and wherein the symbolically referenced buffer name includes both letters and numbers.

14. The article of claim 13, wherein execution of the instructions further results in:

translating the set of allocate buffer instructions into code.

15. The article of claim 14, wherein execution of the instructions further results in:

providing the code.

16. An article, comprising:

a processor; and a medium storing a set of allocate buffer instructions, said allocate buffer instructions including:

an allocate buffer instruction associated with a first thread that includes an indication of a read/write status and uses a buffer name to symbolically reference information that a first thread context will store in local memory at a multithreaded network processing element; and an allocate buffer instruction associated with a second thread that includes an indication of a read/write status and uses the buffer name to symbolically reference information that a second thread context will store in the local memory at the network processing element, wherein the symbolically referenced buffer name includes both letters and numbers.

17. A method, comprising:

defining an allocate buffer instruction associated with a first thread that includes an indication of a read/write status and uses a buffer name to symbolically reference information that a first thread context will store in local memory at a multithreaded network processing element; and defining allocate buffer instruction associated with a second thread that includes an indication of a read/write status and uses the buffer name to symbolically reference information that a second thread context will store in the local memory at the network processing element;

wherein the symbolically referenced buffer name includes both letters and numbers.

18. The method of claim 17, further comprising:

arranging for the allocate buffer instruction to be translated into code.

19. A system, comprising:

a processor; and a hard disk drive having stored therein instructions that when executed by a machine result in the following:

translating C programming language instructions into code, and translating an additional allocate buffer instruction into code, the additional allocate buffer instruction including an indication of a read/write status and using a buffer name to symbolically reference information that a thread context will store in local memory at a multithreaded network processing element, wherein the symbolically referenced buffer name includes both letters and numbers.

20. The system of claim 19, further comprising:

an interface to facilitate a transfer of the code from the system to the network processing element.

* * * * *